(12) United States Patent
Davani

(10) Patent No.: US 6,208,839 B1
(45) Date of Patent: Mar. 27, 2001

(54) REMOTE TOKEN BASED INFORMATION ACQUISTION SYSTEM

(75) Inventor: Shouresh Tony Davani, Lantana, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 08/769,813

(22) Filed: Dec. 19, 1996

(51) Int. Cl.[7] .................................................. H04Q 3/02
(52) U.S. Cl. .......................... 455/31.3; 455/412; 455/507
(58) Field of Search ................................... 455/413, 412, 455/426, 458, 459, 31.3, 32.1, 38.1, 507, 38.4; 395/200.36, 200.37; 340/825.44, 311; 707/10, 104

(56) References Cited

U.S. PATENT DOCUMENTS

| | | | |
|---|---|---|---|
| 4,940,963 | * | 7/1990 | Gutman et al. ....................... 340/313 |
| 5,426,594 | * | 6/1995 | Wright et al. .................... 395/200.36 |
| 5,517,605 | * | 5/1996 | Wolf ...................................... 395/155 |
| 5,574,771 | * | 11/1996 | Driessen et al. ..................... 455/31.3 |
| 5,604,788 | * | 2/1997 | Tett ....................................... 455/512 |
| 5,675,507 | * | 10/1997 | Bobo ............................... 395/200.36 |
| 5,710,918 | * | 1/1998 | Lagarde et al. ....................... 395/610 |
| 5,809,415 | * | 9/1998 | Rossmann ............................. 455/422 |

* cited by examiner

Primary Examiner—Lee Nguyen
(74) Attorney, Agent, or Firm—Gregg E. Rasor; Philip P Macnak

(57) ABSTRACT

A remote token based information acquisition system (100) operates generate the wireless request and delivery of information corresponding with a uniform resource locator. The system includes a personal messaging device (200) having a receiver (205) that receives a selective call message including a selective call address and a canned message representing the uniform resource locator. A microprocessor (207) operates to determine selection of the personal messaging device, decoding, storage, and presentation the canned message. A transmitter (204) coupled to the processor operates to send a reverse channel message requesting information corresponding with the uniform resource locator.

8 Claims, 7 Drawing Sheets

200

REMOTE TOKEN BASED INFORMATION ACQUISTION SYSTEM

FIELD OF THE INVENTION

This invention relates in general to two way personal messaging devices and more particularly to a two way personal messaging device that allows a user to access information residing on an intranet or Internet server.

BACKGROUND OF THE INVENTION

Generally, if a user desires to access information residing on an intranet or Internet server, they must have direct access to a device having a wired connection to the intranet or Internet, the device further having a TCP/IP protocol stack running. Although devices of this sort are fairly common now, they require a direct physical connection, e.g., via a dedicated high speed network or a dial-up network. This is inconvenient for a user that is mobile, since they must access one of these connections using either a modem (in that case of dial-up access) or a network adapter that supports TCP/IP.

Even with cellular telephone connections, the user is faced with an extremely inefficient information transfer because the TCP/IP protocol stack must run on top of an asynchronous protocol such as PPP (point-to-point protocol) which is commonly used to access dial-up Internet services. The result is an expensive, inefficient connection that requires high bandwidth to convey information to the user. Moreover, present Internet browser software requires several megabytes of memory to execute on a portable or other computing device. Furthermore, presentation of retrieved information in a format resembling that intended by an author or publisher of a document (e.g., an intended mode of presentation) requires a fairly large information display. These constraints are clearly not practical when considering the small amount of memory available, and small display size of portable personal messaging devices, since the retrieved information cannot be presented in large screen formats associated with conventional Internet browsers. Lastly, the markets in which such portable personal messaging devices are sold require that the device have extended operation time while away from typical alternating current power sources, and that the device remain portable, e.g., weighing only several hundred grams at most.

Consequently, what is needed is an apparatus that allows a mobile user to efficiently access Internet resources while maintaining extended battery life.

DESCRIPTION OF A PREFERRED EMBODIMENT

Figure 1:
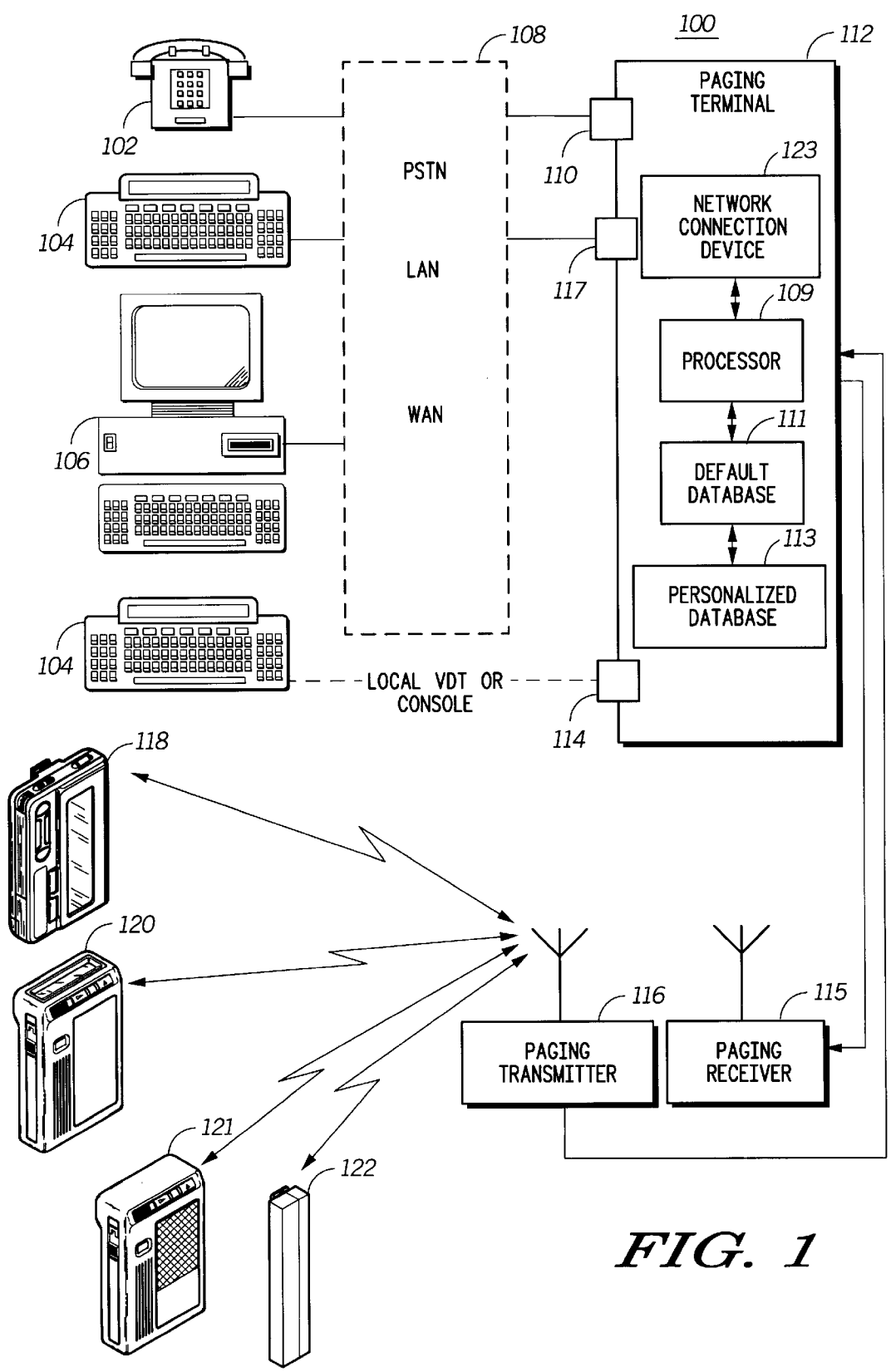
FIG. 1 is a block diagram of a selective call communication signaling system configured for operation in accordance with the present invention.

Referring to FIG. 1, a remote token based information acquisition system (e.g., a paging system 100), accepts page or messaging requests from several external sources, e.g. a telephone 102, a page entry device 104, and a computer with a modem 106. The computer 106 show here is exemplary in nature, and can function as a messaging client, a world wide web client, or as a world wide web host for both retrieving and serving information to other clients.

The page or messaging request is normally accepted through a telephone network input for a public or private telephone network 108 that preferably includes capabilities for connecting to a local area network (LAN) or wide area network (WAN) for effecting high speed network connections to devices such as a host computer 106. The public or private telephone network 108 couples the page request from one of the sources (i.e., callers) to an automatic telephone input 110 at a paging terminal 112. Optionally, a dedicated input 114 at the paging terminal 112 can accept a page request from a local video display terminal or console. The dedicated input 114 is usually associated with a telephone switchboard and message dispatch service that accepts the page request from a telephone caller and enters the page request into the paging terminal 112 typically via the video display terminal. The public or private telephone network 108, as well as dedicated inputs, facilitate connection of one or more network connection devices 123 such as modems or high speed network interfaces, e.g., IEEE 802.3 or the like, supporting TCP/IP or the like connections to both the Internet and intranets.

Additionally, the paging terminal comprises a processor 109, a default bookmark database 111 where default system bookmarks are stored, and a personalized bookmark database 113 where personalized bookmarks are stored. It is these components that allow a user to easily access Internet and intranet resources.

After accepting the page request, the paging terminal 112 encodes and transmits, via a conventional transmitter 116, a selective call message comprising a selective call address, and possibly a canned message, to a selective call receiver (more generically referred to as a personal messaging device). Conventional paging systems may convey information from a caller to pager user via a plurality of message formats. These message formats are commonly referred to as message sources, each of which can denote a mode of data (e.g., characters, numbers, audio, graphics, or "just a beep") being sent to the pager. FIG. 1 illustrates a number of selective call receivers, subscriber units, personal messaging units, personal messaging devices, or the like, that may receive information via either an alphanumeric display message page (this type of messaging device is shown in more detail in FIG. 2) 118, a numeric display message page 120, a voice message page, 121 or a tone only page 122. In the later case, the tone only page 122 (i.e., no message page), alerts (e.g., an audible beep), the user that a caller wants the pager user to respond by calling a prearranged telephone number, such as a receptionist telephone number.

Alternatively, the paging terminal 112 is coupled with a paging receiver 115 that operates to receive reverse channel signaling information (e.g., acknowledge back pages) from a two-way capable selective call receiver. The acknowledge back response conveys information such as whether a particular message was correctly received (i.e., without errors) or possibly, a response either generated ad hoc or from a predetermined list of "canned" responses. In response to a content of the reverse channel signaling information, the paging terminal 122 will search the default bookmark database 111 or the personalized bookmark database 113, and based on matching a token returned in the reverse channel message, the paging terminal 112, using the processor 109 in conjunction with the network connection device 123 accesses a host computer 106 to retrieve information content representing information corresponding with a uniform resource locator (url). The information content may then be broadcast as a return selective call message to the requesting messaging device in either its raw form (e.g., the actual information content of the document or object pointed to by the url), or as formatted by the paging terminal 112 for proper display by the personal messaging device.

To load bookmarks in the personal messaging device, the processor 109 creates the personalized bookmark database 113 containing personalized bookmarks as selected by a user or by default, and a generates a corresponding personalized bookmark canned message. The personalized bookmark canned message will be more fully discussed in reference to FIG. 7, and may be an abbreviated version of the text accompanying the url, and the canned message may contain a number as a token representing the specific entry of the personalized bookmark in the personalized bookmark database 113 stored at the paging terminal 112.

A conventional selective call receiver commonly receives a message, alerts the pager user, and optionally presents the message information according to a message format that is mapped to a pager address on the paging system. The unique pager address typically represents the message format (e.g., alphanumeric, numeric, voice, or tone only), supported by the selective call receiver. Therefore, by matching the unique pager address with the appropriately formatted message, a page with a specific message format may be effectively broadcast to selected personal messaging devices by the paging terminal 112.

Modern selective call receivers may be capable of receiving and presenting message information in a plurality of formats, typically using separate pager addresses mapped to the same selective call receiver. When more than one format is supported by a selective call receiver, there may be several unique sources (paging addresses) associated with the receiver that will allow correct reception of a different message format. For example, one pager address may be mapped to a numeric display message format and a second pager address may be mapped to a voice message format. Therefore, information may be conveyed from a caller to the pager user in either numeric display message format or voice message format.

Hence, the aforementioned communication system 100 is capable of receiving message information in a plurality of formats. The message formats are mapped to unique pager addresses supported by the communication system. Where more than one pager address and message format pairs are mapped to the same selective call receiver, information may be conveyed from a caller to a pager user in a plurality of message formats as discussed above.

Figure 2:
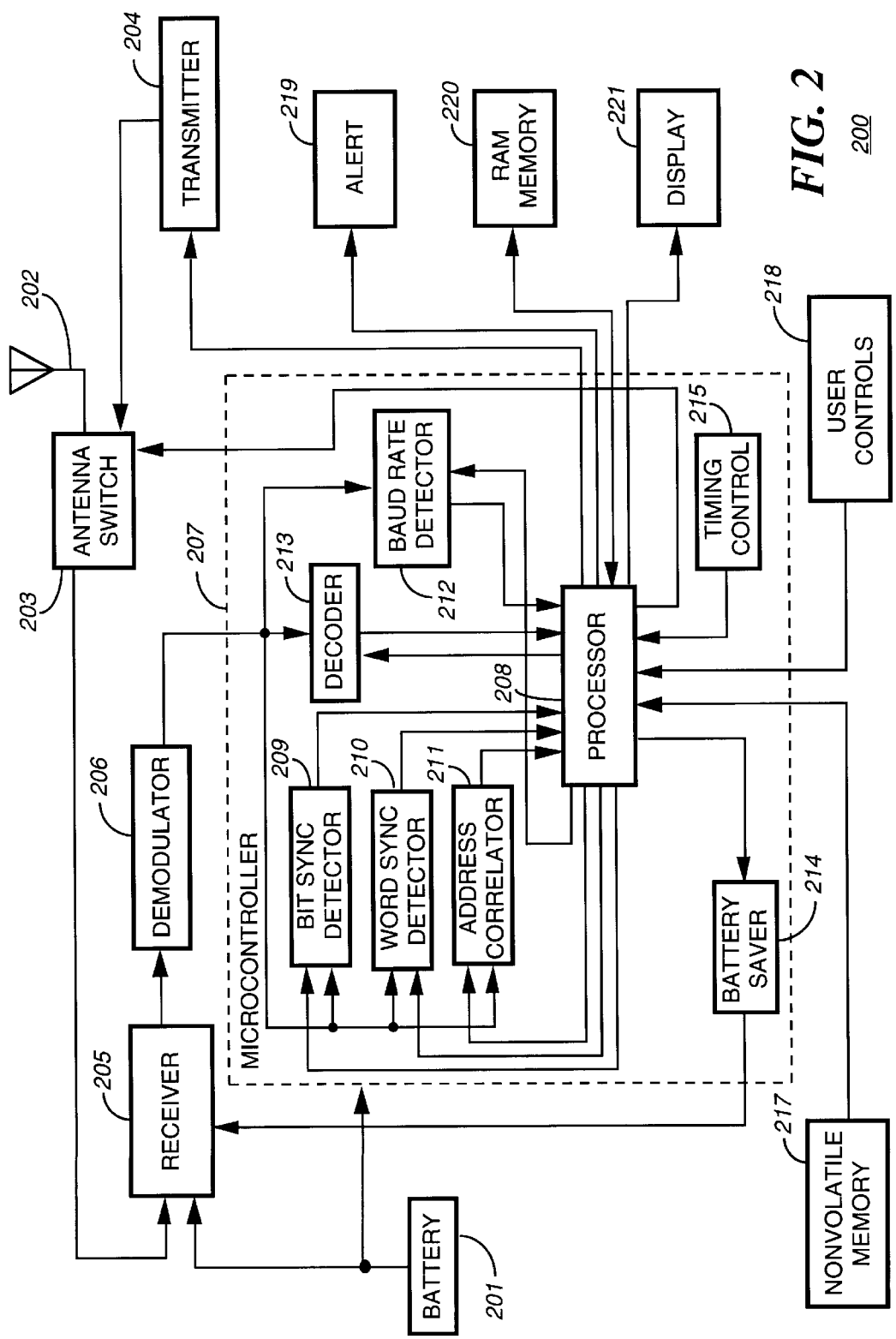
FIG. 2 is a block diagram of a typical personal messaging device for use in accordance with the preferred embodiment of the present invention.

Referring to FIG. 2, the illustration shows a typical block diagram for a personal messaging device (e.g., such shown in FIG. 1, being capable of receiving an alphanumeric message 118, a numeric message 120, a voice message 121, or a tone only message 122, in accordance with the present invention. A battery 201 supplies power to the personal messaging device 200 which operates to receive an information signal via an antenna 202. An antenna switch 203 couples the antenna 202 between one of a transmitter 204 or a receiver 205 that couples the received information signal to a conventional demodulator 206 that is capable of recovering analog or digital information. Received digital information is recovered as a serial bit stream that is then coupled to a microcontroller 207 for interpreting and decoding the serial bit stream as address, control, and data signals. In the preferred embodiment, the microcontroller 207 may comprise a processor 208, a bit synchronization detector 209, a word synchronization detector 210, an address correlator 211, a baud rate detector 212, a data decoder 213, a battery saving control circuit 214, and a timing control 215, implemented in hardware, software, or a combination thereof. Examples of commercially available microcontrollers suitable for implementing the preferred embodiment of the present invention are Motorola's MC68HC05xx, MC68HC08xx, M68HC11xx, or the like. Complete descriptions of these devices are available in Motorola's data book set entitled "Microprocessor, Microcontroller, and Peripheral Data," volumes I and II, Series A, © 1995 by MOTOROLA, INC.

More specifically, in the microcontroller 207 the serial bit stream is coupled to the baud rate detector 212 that determines a receiving data rate associated with the recovered information. When the receiving data rate is determined, the bit synchronization detector 209 establishes synchronization between the microcontroller's data decoding components (208, 211, and 213) and the individual signals (e.g., address, control, and data signals) in the recovered information. Once bit synchronization is established, the word synchronization detector 210 searches the serial bit stream for information indicating the beginning of a batch or frame. When the microcontroller 207 has established both bit and word synchronization, the recovered information may be searched for a group identification code associated with the personal messaging device. When a group identification code is found corresponding to the personal messaging device, it will search only those code frames associated with it's group for pages intended for the personal messaging device. During the period between like frames, the microcontroller 207 will preferably activate the battery saver 214 to "shut-down" the receiver 205 and demodulator 206, thereby conserving power and extending battery life. The interval between like frames is known in the art as a "sleep" period. Preferably, the system protocol operates such that pages targeted for a specific group identifier, and pages intended for a particular personal messaging device, are sent only during the transmission of that peripheral's designated paging group, therefore, no pages are missed during the sleep period. A peripheral that operates in this fashion is said to be in a "battery saving" mode.

In determining the selection of the particular personal messaging device, a correlation is performed between a predetermined address associated with the personal messaging device and a received address. To accomplish this, the address correlator 211, which comprises a signal processor, performs a comparison between the address signal recovered from the received information signal and a predetermined address associated with the personal messaging device, generating a detection indicating selection of the personal messaging device when the recovered address is substantially equivalent to the predetermined address. The predetermined address or addresses associated with the personal messaging device are preferably stored in the non-volatile memory 217 or code plug. Optionally, the non-volatile memory 217 may reside inside a support integrated circuit (not shown) or in the microcontroller 207 itself. The non-volatile memory 217 typically has a plurality of registers for storing a plurality of configuration words that characterize the operation of the personal messaging device, and may be used to store representations of one or both of the default and personalized bookmarks, including a copy of the personalized bookmark(s) stored in the personalized bookmark database 113. When a detection is generated, the microcontroller 207 may generate an alert responsive to a selected alerting mode, e.g., a tone alert would be generated when a tone-only mode is selected. Alternatively, in response to a valid data address correlation and a corresponding detection, the decoder 213 operates to decode at least one message from the received information signal and couples message information to a RAM (Random Access Memory) 220.

In accordance with the recovered information, the programmed operating parameters stored in the non-volatile memory 217, and settings associated with the user controls 218, the personal messaging device may present at least a portion of the message information, such as by an information display 221. Alternatively, the user may be alerted that a message has been received by an alert transducer 219 that generates an audible, visual, or tactile alert. The user may view received message information on the information display 221 by manually activating an appropriate user control 218 such as a message read control (not shown).

The microcontroller 207 may also include items such as a conventional signal multiplexer, a voltage regulator and control mechanism, a current regulator and control mechanism, environmental sensing circuitry such as for light or temperature conditions, audio power amplifier circuitry, control interface circuitry, and information display illumination circuitry. These elements are arranged in a known manner to configure the personal messaging device as requested by a customer.

In the preferred embodiment, upon receipt of a message, the processor 208 communicates the decoded received message to the RAM 220 for temporary storage of the message. If the message is a "canned" message, e.g., one commonly referred to as a predetermined, pre-stored, or programmable message, or token representing a canned message, all of which serve to represent selected information accessible via the paging terminal 112, it may be stored in either non-volatile memory 217 or RAM 220. Upon successful reception and decoding of the message, the transmitter 204, as instructed by processor 208, may generate an automatic acknowledge back response to the paging terminal 112 indicating that the message has been correctly received and decoded. However, if the decoder 213 cannot successfully decode the message, a negative acknowledge back response is returned to the paging terminal 112 indicating that the message has not been correctly received and decoded.

In accordance with the preferred embodiment of the present invention, the user may select one or more of the responses provided by the canned messages received, and the processor 208 will generate an acknowledge back response containing a request representing the information desired by the user. The acknowledge back response is broadcast to the paging terminal 112 via the transmitter 204. In turn, the paging terminal 112 receives the request and operates to access the information using a conventional Internet access device, e.g., a computer running TCP/IP protocol or the like. The paging terminal 112 may then format the retrieved information for transmission to the personal messaging device 200. The information is then broadcast to the personal messaging device 200 which decodes and preferably stores and presents the information in a format substantially similar to that intended by an originator. If needed, the computer or personal messaging device may selectively format the retrieved information to take best advantage of the information display capability of the personal messaging device.

In this way, the personal messaging device 200 gives a paging subscriber the option of operating as a conventional standalone selective call paging receiver, that is, receiving, storing and displaying messages. It further allows the communication of messages containing information such as tokens and "canned messages" representing uniform resource locators that access Internet related resources for communication to the personal messaging device 200.

Figure 3:
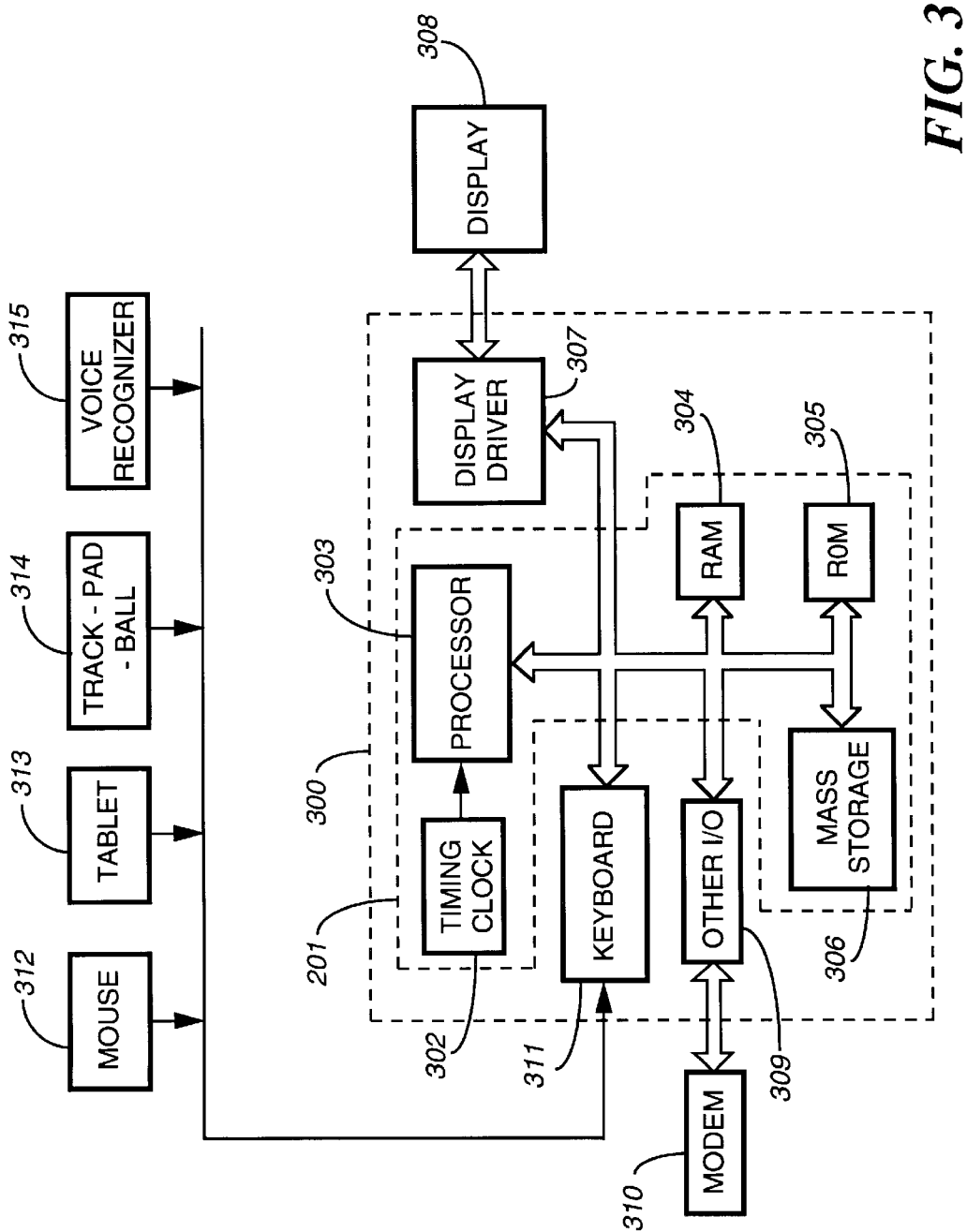
FIG. 3 illustrates an electronic information processing device or computer configured for operation in accordance with the preferred embodiment of the present invention.

Referring to FIG. 3, the illustration shows an electronic information processing device 300 or computer, configured for operation in accordance with the preferred embodiment of the present invention. The computer 300 may encompass any number of devices such as a dedicated pocket paging assistant, a personal computer, an electronic pocket organizer, a laptop computer, a personal digital assistant, or the like. As illustrated, the electronic information processing device 200 or computer minimally comprises a microcontroller 301 with a system timing clock 302, central processing unit 303, electronic memory in the form of random access memory (RAM) 304, read only memory (ROM) 305, mass storage (e.g., a disk drive or the like) 306, a display driver 307, general I/O interface or data port 308, and an interface 309 that accommodates any number of input means for general information entry. In the preferred embodiment, the computers information input means 309 (e.g. a keyboard 311, a mouse 312, a pen or puck activated tablet, or trackpad 313, a track ball 314, an audio activated command processor 315, or the like) allows a user to enter and manipulate information. After information is entered, it may be communicated to the paging terminal 112 via a conventional modem 310 or the like. The system formed by the elements depicted in FIGS. 1 and 2 realizes many advantages over the prior art selective call messaging systems and screen saver systems. The electronic information processing device or computer 300 can be commanded to automatically send either user entered or pre-stored messages to a selective call messaging subscriber defined in the screen saving application. Since the computer 300 includes both message storage and transmission capability, the system essentially functions as a real time or deferred information access system. For instance, this system would eliminate the problem of being away from a fixed location such as your office, and needing to access information on an intranet or the Internet.

Figure 4:
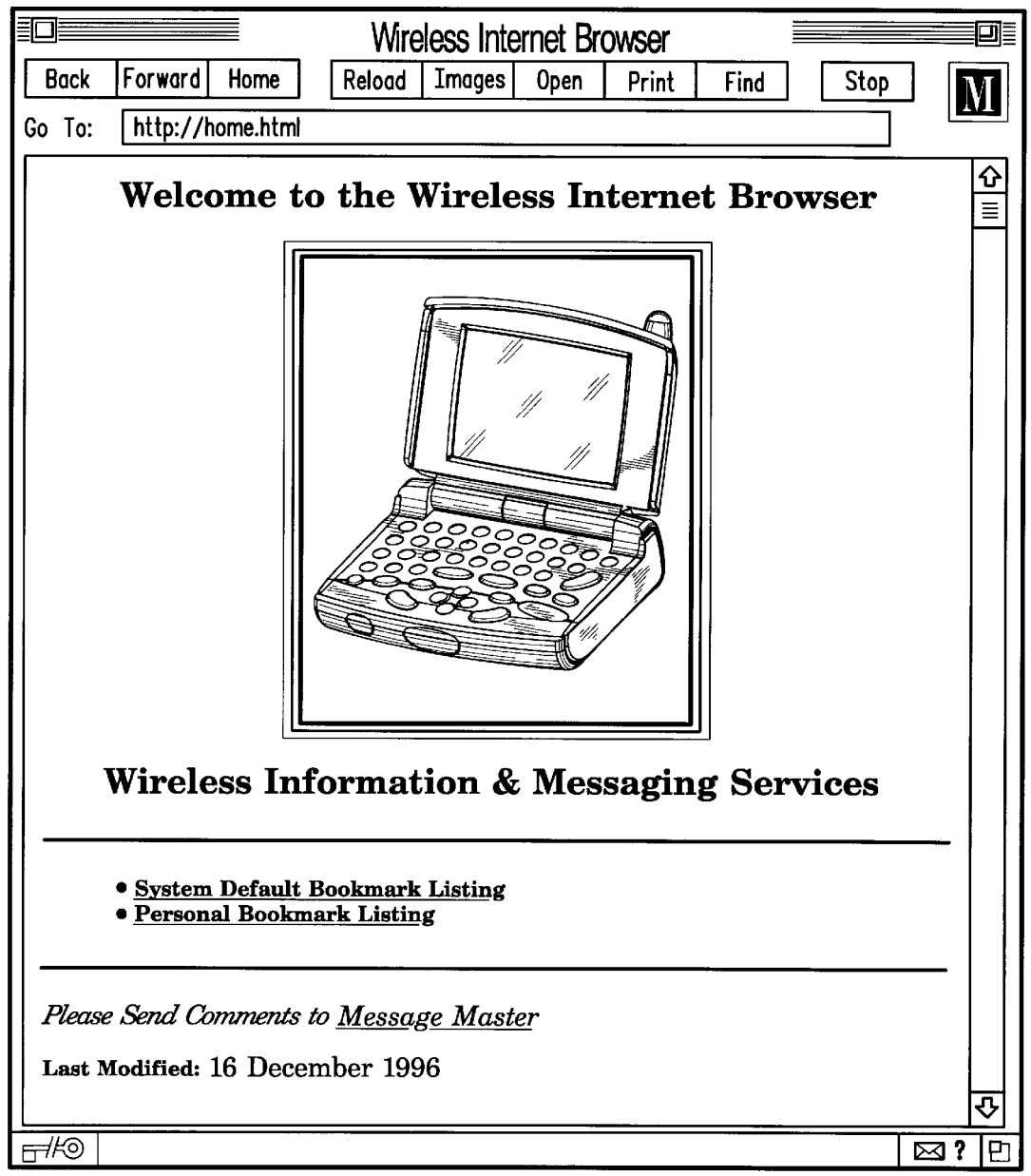
FIG. 4 illustrates a typical Internet web browser access screen for retrieving both default and personalized bookmarks communicated to the paging terminal and personal messaging device in accordance with the present invention.

Referring to FIG. 4, the illustration shows a typical Internet web browser access screen 400 for retrieving both default and personalized bookmarks communicated to the paging terminal and personal messaging device in accordance with the present invention.

The screen 400 includes conventional hyperlink annotations for a "System Default Bookmark Listing" and a "Personal Bookmark Listing." When a user wants to view either of these categories, the user selects the category by navigating to the hyperlink and selecting the link. Any number of means can be used to access the information stored at the hyperlink, such as an "html" (hyper text markup language) compliant browser that implements the "http" (hyper text transport protocol" suite. These components are typically integrated in a single executable application that runs on a personal computer such as illustrated in FIG. 3.

Figure 5:
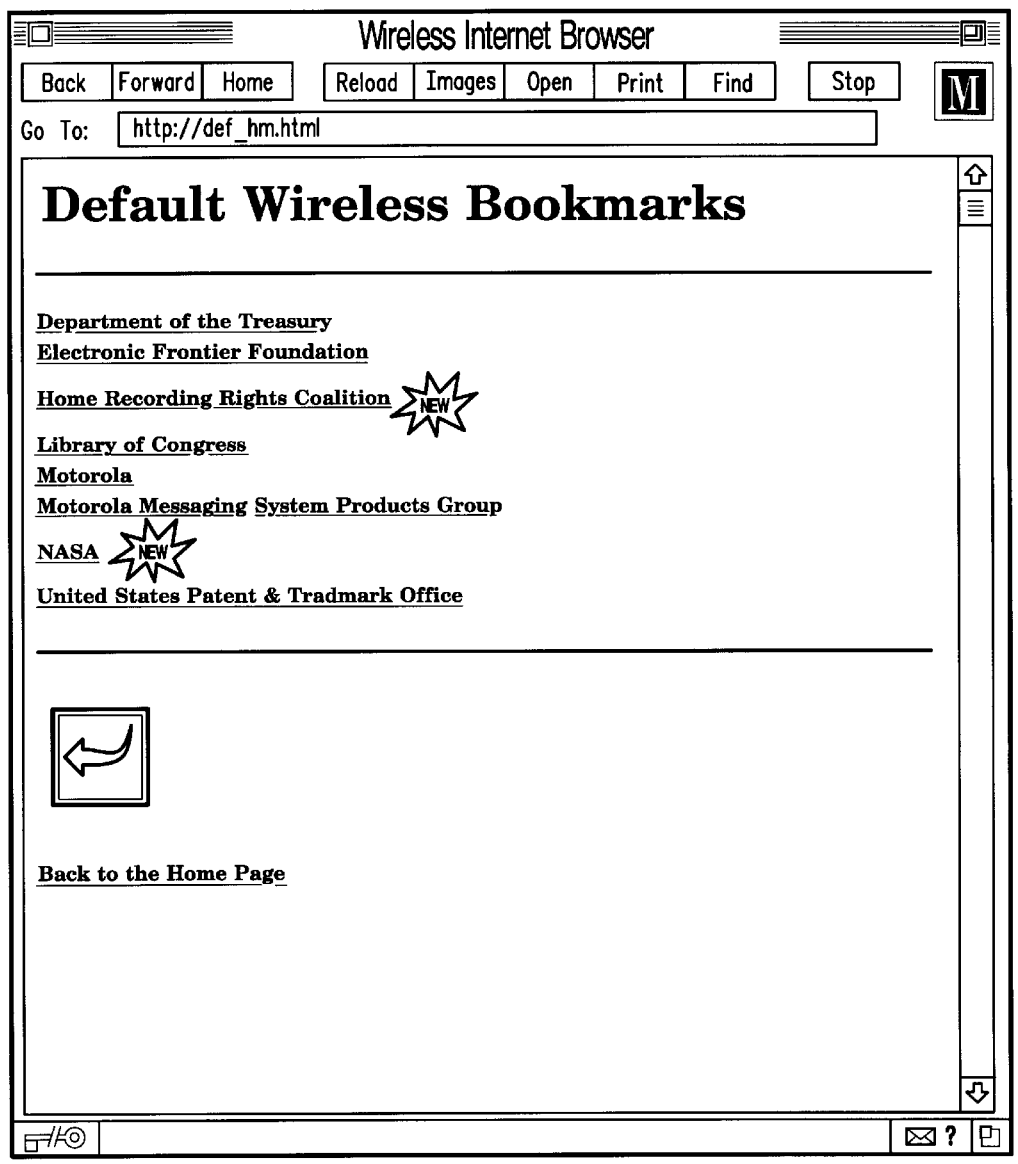
FIG. 5 illustrates a typical Internet web browser access screen for retrieving default bookmarks communicated to the paging terminal and personal messaging device in accordance with the present invention.

Referring to FIG. 5, the illustration shows a typical Internet web browser access screen 500 for retrieving default bookmarks communicated to the paging terminal and personal messaging device in accordance with the present invention.

The screen 500 show in FIG. 5 is accessed by executing the "url" (uniform resource locator) associated with the hypertext link "System Default Bookmark Listing" shown in FIG. 4. On this screen, several predetermined urls are presented, corresponding with those stored in the default bookmark database 111. Note that new urls are highlighted with the word "NEW" to notify the user on recent additions.

The default bookmark database 111 contains a default bookmark (or bookmarks, as displayed) and a corresponding default bookmark canned message. If the user wants to add one of the default bookmarks to their list of personal bookmarks, they can selectively include and exclude default bookmarks from the default bookmark database 111 as personalized bookmarks in the personalized bookmark database 113. When a user selects a displayed bookmark, the user has the option to add this bookmark to their personal database, delete or exclude this bookmark from their personal database, or to view the information as pointed to by the bookmark. This operation can be performed at either the computer 300 or using the personal messaging device 200.

Figure 7:
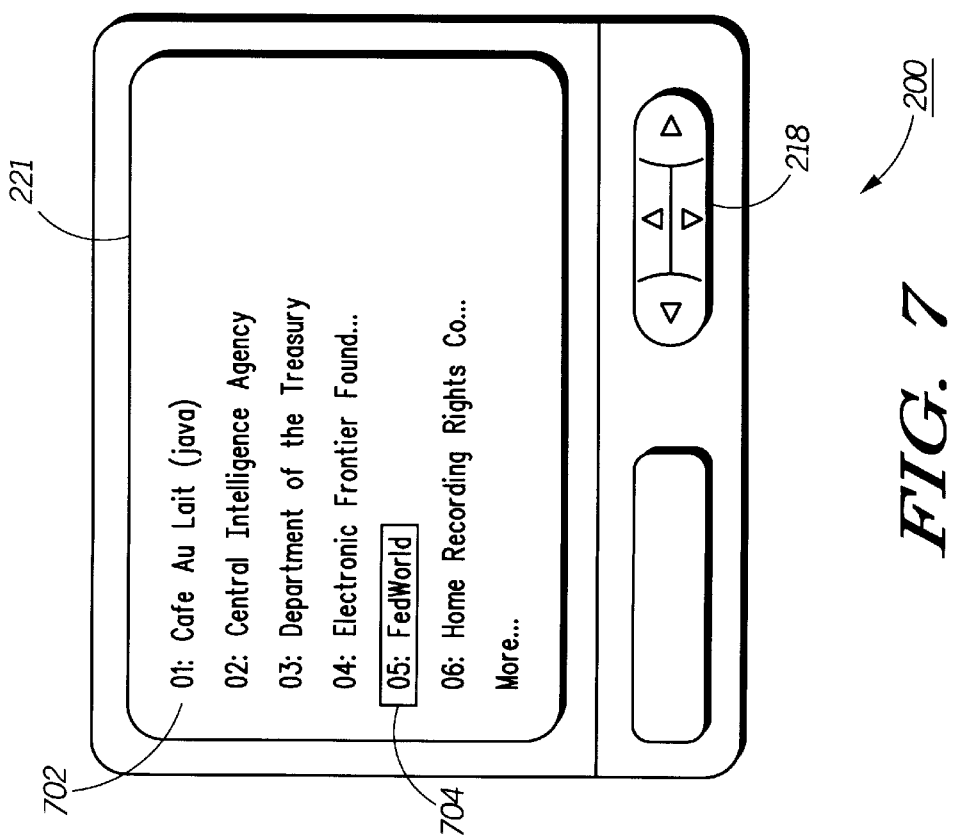
FIG. 7 illustrates a typical Internet web browser access screen on a personal messaging device for configuring and accessing personalized bookmarks communicated to the paging terminal and personal messaging device in accordance with the present invention.

The canned message corresponding with the selected bookmark is sent to the personal messaging device 200. Transmission may be immediate or deferred. The canned message comprises, either singly or in combination, a textual representation of the displayed text annotating the url (e.g., "FedWorld"), the url (e.g., http://fedworld.gov), and a tokenized representation (e.g., 05: FedWorld, as shown in FIG. 7).

Figure 6:
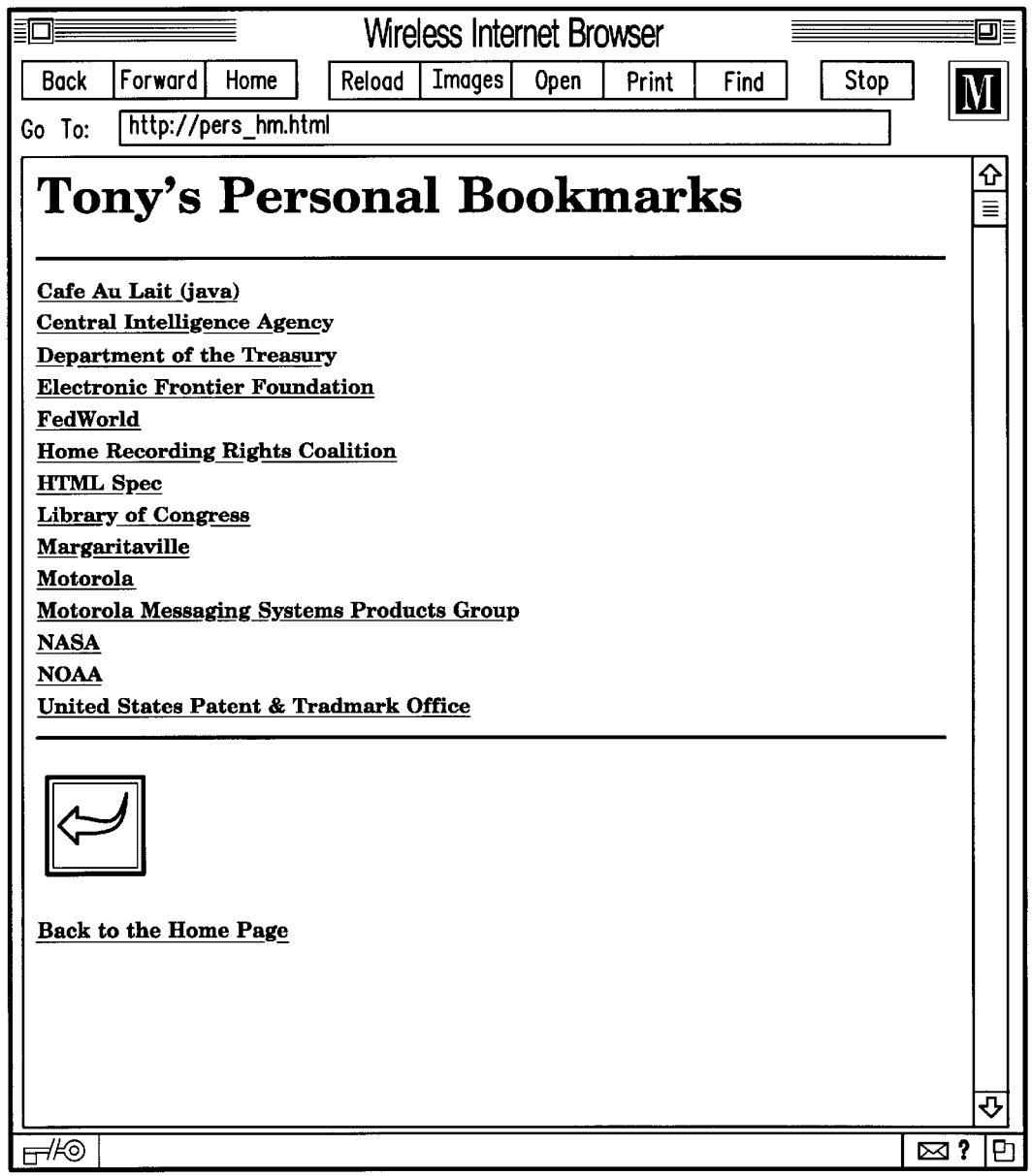
FIG. 6 illustrates a typical Internet web browser access screen for configuring personalized bookmarks communicated to the paging terminal and personal messaging device in accordance with the present invention.

Referring to FIG. 6, the illustration shows a typical Internet web browser access screen 600 for configuring personalized bookmarks communicated to the paging terminal and personal messaging device in accordance with the present invention.

The access screen 600 in FIG. 6 represents "Tony's Personal Bookmarks." These bookmarks are stored in the personalized bookmark database 113 on the paging terminal 112, and accessed from one of the devices such as the personal computer 106 or electronic information processing device 300. These personal bookmarks may be configured from this screen as discussed in reference to FIG. 5, using either the browser running on the computer 300 or the personal messaging device 200. Additional bookmarks can be added as required while browsing by invoking an add function.

When a bookmark is added that does not appear in either the default bookmark database 111 or personalized bookmark database 113, the personal computer 106 or electronic information processing device 300 notifies the paging terminal 122 to add the new bookmark to the personalized bookmark database 113. Moreover, the local client, e.g., the personal computer 106 or electronic information processing device 300, may also add the new bookmark to a local database (in the non-volatile memory of the personal messaging device) that replicates the information (e.g., the tokens) stored in the personalized bookmark database 113 on the paging terminal 112. In each of the above cases, a token is generated by the paging terminal 112 and stored in the personalized bookmark database 113, along with a canned message representing the textual annotation of the url, and the actual url. In this way, the personal messaging device 200 need only use enough memory to store the token and an associated label, e.g., the canned message, which may be an abbreviation of the full name associated with the url.

Referring to FIG. 7, the illustration shows a typical Internet web browser access screen on a personal messaging device for configuring and accessing personalized bookmarks communicated to the paging terminal and personal messaging device in accordance with the present invention.

The personal messaging device 200 displays, using the information display 221, a list of canned messages and associated tokens 702. The tokens (e.g., 01, 02, 03, 04 . . . in this case) compactly and conveniently represent the actual url pointers and information content. By way of example, this particular personal messaging device 200 displays six access locations on a screen, allowing the user to select (shown in inverse contrast) 704 any one to request access (via a reverse channel message) and load the information content corresponding with the uniform resource locator.

Figure 8:
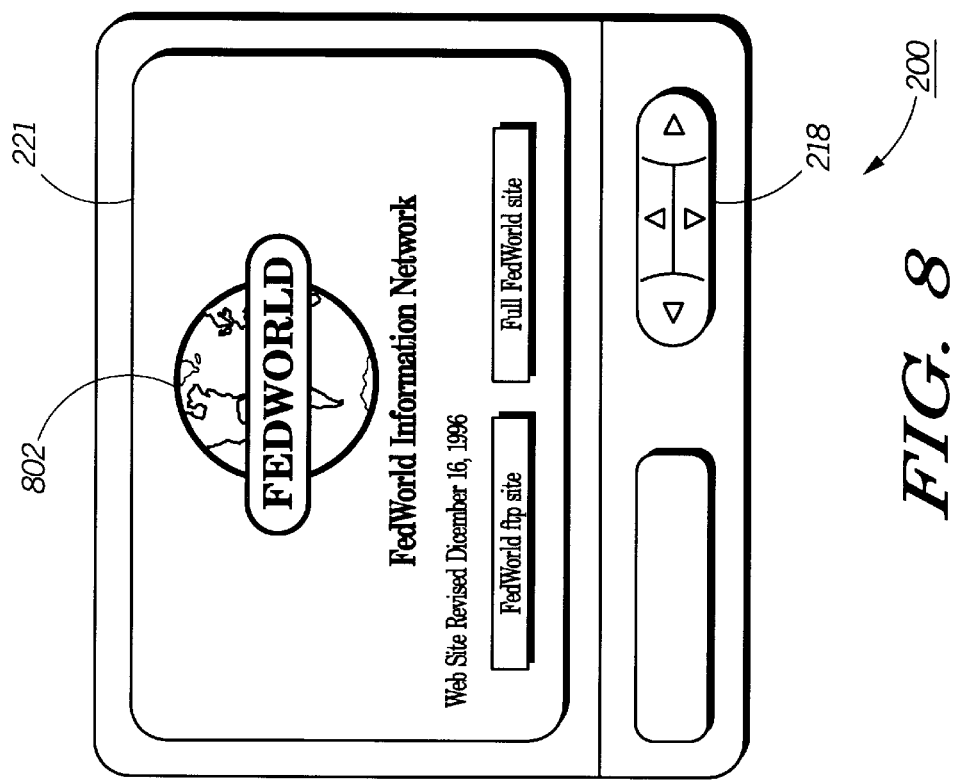
FIG. 8 illustrates a typical Internet web browser access screen on a personal messaging device for presenting information communicated to the personal messaging device from the paging terminal in accordance with the present invention.

Referring to FIG. 8, the illustration shows a typical Internet web browser access screen on a personal messaging device for presenting information communicated to the personal messaging device from the paging terminal in accordance with the present invention.

In FIG. 8, the processor in the personal messaging device operates to format the information corresponding with the uniform resource locator for presentation on the information display in a manner that substantially corresponds with an intended mode of presentation, e.g., in a format resembling that intended by the author or publisher of a document. More simply, the information received from the paging system, that which was retrieved from the url, is formatted by either the personal messaging device or the paging terminal to closely resemble the way it would have been presented on the browser for which it was created. Alternatively, the information may be presented in a text only mode, replacing graphics with "place holders" containing text in those areas that are context sensitive. This preserves the functionality of the original source document (html source) while significantly decreasing the amount of air-time needed to convey messages between the wireless host (e.g., paging terminal 112) and the personal messaging device 200.

Lastly, the information may be presented in a pure text only mode where the graphics and place holders are deleted by either the paging terminal 112 or the personal messaging device 200. Preferably, the paging terminal 112 would perform this function, since this would result in the most efficient use of broadcast air-time by reducing the amount of data that needs to be sent to the personal messaging device 200.

As can be appreciated by one of ordinary skill in the art, this invention can be realized in a number of embodiments of which the disclosed embodiment is only one of many equivalent alternatives. The encoding methods, canned messages, proposed token scheme and procedures, as well as the wireless protocols, are illustrated by way of example, and future improvements in these area can easily be adapted to accommodate the principles embodied in the present invention.

I claim:

1. A remote token based information acquisition system, comprising:
- a paging terminal, comprising
  - a processor,
  - a receiver coupled to the processor, the receiver operating to receive the reverse channel message requesting information corresponding with the uniform resource locator,
  - a transmitter coupled to and responsive to the processor, that based upon the reverse channel message, controls the transmitter to broadcast a return selective call message with an information content representing information corresponding with the uniform resource locator,
  - a network connection device coupled to the processor, the network connection device operating to acquire an actual information content as pointed to by the uniform resource locator in response to the processor matching a token returned in the reverse channel message with one of the corresponding default bookmark canned message and the corresponding personalized bookmark canned message,
  - a default bookmark database coupled to the processor, the default bookmark database containing a default bookmark and a corresponding default bookmark canned message, and
  - a personalized bookmark database coupled to the processor and the default bookmark database, the personalized bookmark database containing personalized bookmark as selected by a user, and a corresponding personalized bookmark canned message; and
- a personal messaging device, comprising
  - a receiver that receives a selective call message comprising a selective call address and a canned message representing a uniform resource locator,
  - a processor coupled to the receiver, the processor operating to determine selection of the personal messaging device, decode, store, and present the canned message representing a uniform resource locator, wherein the processor in the personal messaging device operates to allow a user to selectively include and exclude default bookmarks from a default bookmark database as personalized bookmarks in a personalized bookmark database,
  - a random access memory coupled to the processor for storing the canned message representing a uniform resource locator, and
  - a transmitter coupled to the processor, the transmitter operating to send a reverse channel message requesting information corresponding with the uniform resource locator.

2. The remote token based information acquisition system according to claim 1 wherein the personal messaging device further comprises:
- a non-volatile memory that stores the canned message representing a uniform resource locator.

3. The remote token based information acquisition system according to claim 1 wherein the random access memory stores an information content of a return selective call message, the information content representing information corresponding with the uniform resource locator.

4. The remote token based information acquisition system according to claim 1 wherein the personal messaging device further comprises:
- an information display that presents a representation of the information corresponding with the uniform resource locator.

5. The remote token based information acquisition system according to claim 4 wherein the processor in the personal messaging device operates to format the information corresponding with the uniform resource locator for presentation on the information display in a manner that substantially corresponds with an intended mode of presentation.

6. The remote token based information acquisition system according to claim 1 wherein the the default bookmark database and personalized bookmark database resides in a paging terminal.

7. The remote token based information acquisition system according to claim 6 wherein a copy of the personalized bookmark database is maintained in a non-volatile memory of the personal messaging device.

8. A paging terminal, comprising:
- a processor;
- a receiver coupled to the processor, the receiver operating to receive a reverse channel message requesting information corresponding with a uniform resource locator;
- a transmitter coupled to and responsive to the processors that based upon the reverse channel message, controls the transmitter to broadcast a return selective call message with an information content representing information corresponding with the uniform resource locator;
- a network connection device coupled to the processor, the network connection device operating to acquire an actual information content as pointed to by the uniform resource locator in response to the processor matching a token returned in the reverse channel message with one of the corresponding default bookmark canned message and the corresponding personalized bookmark canned message;
- a default bookmark database coupled to the processor, the default bookmark database containing a default bookmark and a corresponding default bookmark canned message; and
- a personalized bookmark database coupled to the processor and the default bookmark database, the personalized bookmark database containing a personalized bookmark as selected by a user, and a corresponding personalized bookmark canned message.

* * * * *